Aug. 29, 1939.　　　G. P. HUMPHREY　　　2,170,898
STABILIZED COUPLER FOR TRACTOR DRAWN TRAILERS
Filed Feb. 10, 1938　　　2 Sheets-Sheet 1
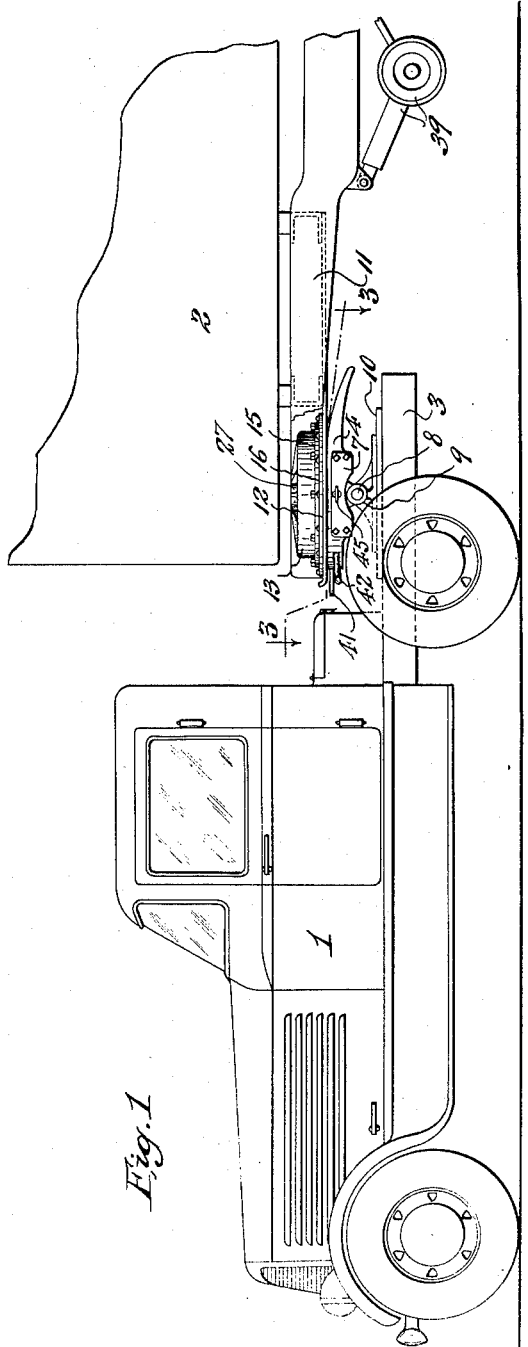
INVENTOR.
George P. Humphrey,
BY George D. Richards
ATTORNEY.

Aug. 29, 1939. G. P. HUMPHREY 2,170,898
STABILIZED COUPLER FOR TRACTOR DRAWN TRAILERS
Filed Feb. 10, 1938 2 Sheets-Sheet 2

INVENTOR.
George P. Humphrey,
BY George L. Richards
ATTORNEY.

Patented Aug. 29, 1939

2,170,898

UNITED STATES PATENT OFFICE 2,170,898

STABILIZED COUPLER FOR TRACTOR DRAWN TRAILERS

George Palmer Humphrey, Mount Vernon, N. Y.

Application February 10, 1938, Serial No. 189,743

5 Claims. (Cl. 280—33.1)

This invention relates, generally, to improvements in means for detachably coupling trailers to tractor-trucks; and the invention has reference, more particularly, to a coupler mechanism having novel stabilizing means to prevent undue swaying or skidding of a trailer when operatively coupled to and drawn along by a tractor truck.

The invention has for its principal object to provide in combination with coupler mechanism for interconnecting a tractor and trailer in pivotal relation, including relatively rotatable members, a hydraulic check or stabilizer means in cooperation with said members for arresting undue sudden swaying or skidding of the trailer relative to the tractor.

The invention has for a further object to provide a novel trailer carried king-pin mechanism adapted to cooperate with a tractor-truck carried fifth-wheel mechanism for coupling the trailer to the tractor-truck, said king-pin mechanism including a novel stabilizer and anti-skid check means adapted to exercise such control over the trailer that skidding, jack-knifing, undue side sway and similar undesired or sudden movements are efficiently prevented, without, however, interfering with normal pivoting movements of the trailer when drawn by the tractor-truck around turns, curving roadways, or otherwise subjected to normal traction movements.

Other objects of this invention, not at this time more particularly enumerated, will be understood from the following detailed description of the same.

An illustrative embodiment of this invention is shown in the accompanying drawings, in which:

Fig. 1 is a side elevation of a tractor-truck and trailer in coupled relation, parts of the trailer being broken away to show the novel stabilized coupler mechanism made according to this invention.

Figure 4:
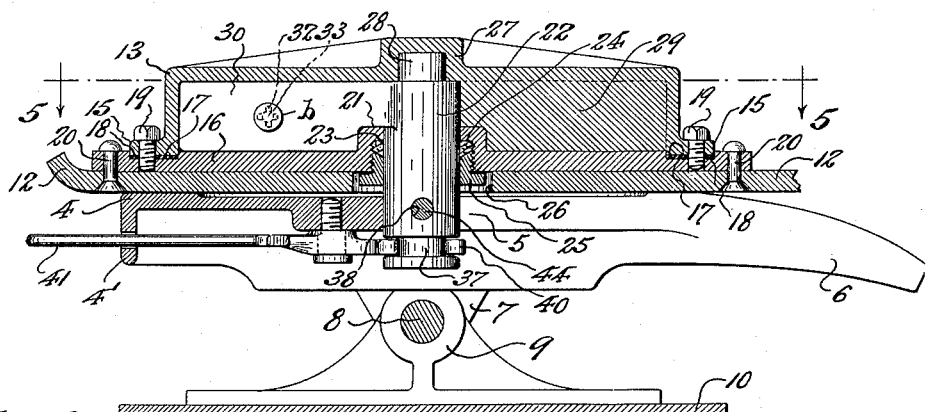
Figure 5:
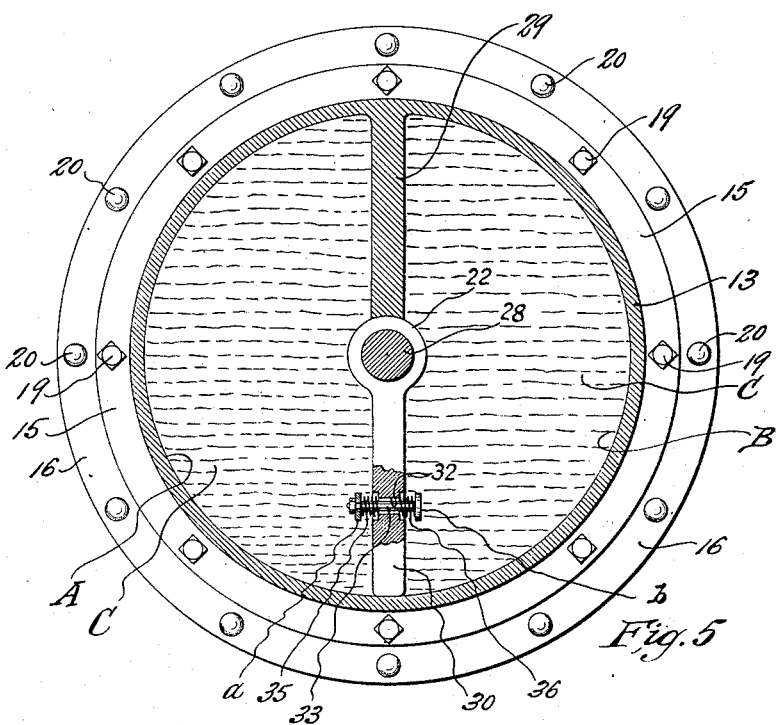
Figure 6:
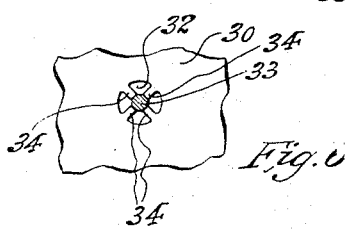

Fig. 2 is a plan view of the trailer carried king-pin mechanism; Fig. 3 is a horizontal section taken on line 3—3 in Fig. 1; Fig. 4 is a vertical longitudinal section, taken on line 4—4 in Fig. 2, but drawn on an enlarged scale; Fig. 5 is a horizontal section, taken on line 5—5 in Fig. 4, and Fig. 6 is an end view of a valve port and the valve rod supporting means thereof with which the check-plate of the king-pin mechanism is provided.

Similar characters of reference are employed in the above described views, to indicate corresponding parts.

Referring to the drawings, the reference character 1 indicates any suitable type of tractor-truck or power driven vehicle, and 2 indicates a trailer adapted to be coupled with and drawn by said tractor-truck.

At the rearward end portion of its frame 3, the tractor-truck is provided with a fifth-wheel means which constitutes an operative part of the coupler mechanism for connecting the trailer 2 with said tractor-truck. This fifth-wheel means is of a type well known to the art, and comprises a fifth-wheel member 4 having a centrally disposed rearwardly open king-pin receiving socket 5 having an outwardly and laterally flaring entrance passage or mouth 6. Said fifth-wheel member 4 is provided with a dependent peripheral flange or skirt 4'. Secured to the opposite lateral sides of said fifth-wheel member are rocker mountings 7, which are fulcrumed upon shafts 8 supported in the stationary straddle bearings 9 suitably affixed to a bed-plate 10 mounted on and affixed to the body platform or frame of the tractor-truck. By this arrangement, free rocking movement about a transverse axis is permitted to the fifth-wheel member.

Suitably affixed to and supported by the frame 11 of the trailer 2 is a carrier plate 12 upon which is mounted a combined king-pin and stabilizer or anti-skid check means. This latter means comprises a chambered body 13 closed at its upper side by an integral top wall 14, but open at its underside. Contiguous to its open underside, said body 13 is provided with an annular flange 15. The open underside of said body is closed by a bottom plate 16 which is provided with an annular depressed seat 17 to receive said flange 15. A sealing gasket 18 is disposed within the seat 17, intermediate the same and said flange 15, and the body and bottom plate are secured together in assembled relation by bolts 19 or other suitable fastening means. The assembled body and bottom plate are in turn fixedly secured to the carrier plate 12 by rivets 20 or other suitable fastening means.

Centrally located in the bottom plate 16 is a bearing 21 through which extends a rotatable king-pin 22. Associated with said bearing 21 is a downwardly open stuffing-box chamber 23 through which the exteriorly projecting end portion of said king-pin 22 extends. Suitable packing material 24 is retained within said chamber 23 and around the king-pin 22 by a gland 25 which is threaded into said stuffing-box chamber. Said carrier plate 12 is provided with an opening 26 through which the gland may be applied, and through which the lower exterior end portion of the king-pin may project.

Formed in the top wall 14 of said body 13 is a bearing 27, the same being aligned with said lower bearing 21, and being sized to receive a journal or trunnion portion 28 with which the upper end of said king-pin 22 is provided.

Integrally formed in connection with said body 13 is an internal radial partition or wall 29 which extends between the rear side of said king-pin 22 and the peripheral wall of said body 13 in alignment with the longitudinal axis of the trailer 2, thus providing a discontinuous annular chamber within said body 13.

Integrally connected with the internal portion of said king-pin 22 is a forwardly and radially extending check-plate 30 having a peripheral shape adapted to conform to and closely fit the radial cross-sectional area of the body chamber. Under operative conditions, this check-plate 30 occupies a fixed position relative to and preferably in alignment with the longitudinal axis of the tractor-truck 1. Said check-plate 30 divides the annular chamber of said body 13 into two sections lying respectively on opposite sides thereof, the same being, for convenience of description, designated herein as compartment A on one side, and compartment B on the other side. These compartments are filled with a suitable liquid C, such, e. g., as an oil of suitable viscosity. To permit the introduction of the liquid C, the top wall 14 of the body 13 is provided with one or more filling openings normally closed by removable plug means 31.

Said check-plate 30 is provided with one or more valve ports 32 to provide normally open means of communication through the check-plate from one compartment to the other of said body chamber. Cooperative with the valve port is a spring balanced normally open valve means. An illustrative embodiment of this valve means comprises a valve rod 33 arranged to extend axially through the valve port. Preferably the latter is internally formed to provide guide ribs 34 to axially support the valve rod 33 for movement therein, while nevertheless leaving intermediate through passages for unimpeded liquid flow through said valve port. The opposite free ends of the valve rod 33 respectively project beyond opposite sides of the check-plate 30, said ends being respectively provided with valve discs $a$ and $b$ affixed thereto, and adapted, when operatively moved toward the check-plate, to close said valve port. Compression spring means 35—36 is arranged between each valve disc and the adjacent side of said check-plate. These springs 35—36 normally but yieldably balance the valve rod and valve discs in position whereby each valve disc is disposed in outwardly spaced relation to that face of the check-plate to which it is opposed, thus normally leaving the valve port passage open to the movement of liquid therethrough in either direction.

The downwardly and exteriorly projecting end portion of the king-pin 22 is provided with an annularly reduced part or neck 37, and above this part or neck 37 is a diametrically extending opening 38 which is disposed transversely or at right angles to the longitudinal axis of the check-plate 30 of said king-pin.

When coupling a tractor-truck 1 to a trailer 2, the forward end of the latter is supported in upraised position by the collapsible prop gear 39 in the usual manner, so that the tractor truck may be backed relative to the trailer to carry the fifth-wheel member of the former beneath the king-pin mechanism of the latter. As this occurs the downwardly and exteriorly projecting lower end of the king-pin 22 enters through the passage or mouth 6 and thence into the receiving-socket 5 of the fifth-wheel member. Said fifth-wheel member is provided with means to lock the king-pin against displacement from said socket 5. As ordinarily provided, this locking means comprises a locking hook 40 pivotally mounted on the under side of the fifth-wheel member and provided with an exteriorly projecting handle lever 41 for manipulating the same. When the king-pin 22 is properly engaged in the socket 5, the locking hook 40 is turned to engage around and embrace the reduced neck 37 of the king-pin 22, thus securing the latter against vertical displacement relative to the fifth wheel member as well as against withdrawal from the socket 5 thereof. Means is provided to secure the locking hook 40 against accidental release from its operative engagement with the king-pin 22. One form of such means comprises a manipulatable draw bolt 42 which cooperates with a stop-nosing 43 carried by the handle lever 41 in such manner that, when engaged therewith, said locking-hook 40 is prevented from turning about its pivotal connection with the fifth-wheel member in king-pin disengaging direction. Means is also provided for interlocking said king-pin 22 and its check-plate 30 against rotation relative to said fifth-wheel member, whereby relative turning movement is only permitted between the chambered body 13 and said king-pin and check-plate while the tractor-truck and trailer are operatively coupled together. This means, in one illustrative form thereof, comprises a retractible lock-pin 44, slidably supported by the fifth-wheel member. When coupling the tractor-truck and trailer together, this lock-pin 44 is manually retracted, by means of the manipulating handle 45 at its outer end, until the king-pin 22 enters fully into the socket 5 of the fifth-wheel member, whereupon the inner end portion of said lock-pin 44 may be projected through the transverse aperture 38 of the king-pin 22, thus interlocking the same with the fifth-wheel member against turning movement relative to the latter.

In the operation of the coupler mechanism, characterized as above set forth, when the trailer 2 is coupled in normal longitudinal trailing alignment to and with the pulling tractor-truck 1, the check-plate 30, by reason of the interlocked relation of the king-pin 22 to the fifth-wheel member, has a fixed relation to the tractor-truck 1, while the chambered body 13 and its partition 29 of the king-pin mechanism has a fixed relation to the trailer 2. When tractor-truck and trailer move along in normal longitudinal alignment the partition 29 and check-plate 30 occupy an aligned diametric disposition across the interior chamber of the body 13, thus dividing the latter into two equal liquid filled compartments A and B, which are in normal intercommunicating relation through the normally open valve port 32.

When the coupled tractor-truck and trailer negotiate normal turns in changing direction, turning corners, or traversing curving roadways, the relative movement between the partition 29 of chambered body 13 and the check-plate 30 of the king-pin 22, in either direction, will be permitted by the compensating flow of the liquid C through the normally open valve-port 32 between the compartments A and B. If, however, due to suddenly occurring side-sway movements, skidding or jack-knifing movements of the trailer 2 relative to the tractor-truck 1, involving occurrence of abnormally rapid relative movements of said partition 29 and check-plate 30, a too sudden compression of the liquid C on one or the other side of the check-plate 30 will occur, so that the normally open relief valve of the latter will tend to close, thus arresting normal intercommunicating and compensating flow of liquid C from one chamber to the other, and consequently setting up a resistance to such sudden movements which will promptly act to arrest the same, thus preventing undue side sway, skidding or jack knifing of the trailer relative to the tractor-truck. For example, if the sudden movement of the trailer is in a direction tending to too rapidly compress the liquid in compartment A, the sudden and excessive liquid pressure in the latter compartment will act upon the valve disc $a$, so as to force the same against tension of spring 35 to close the valve port 32, thus rapidly diminishing and eventually arresting flow of liquid C from compartment A to compartment B, and consequently a resistance to the undesirable sudden side sway, skidding or jack-knifing of the trailer is progressively and quickly accumulated with arresting effect thereupon. If, on the other hand, the sudden movement of the trailer is in a direction tending to too rapidly compress the liquid in compartment B, the sudden and excessive liquid pressure in the latter compartment will act upon the valve disc $b$, so as to force the same against tension of spring 36 to likewise close the valve port 32 against flow of liquid from compartment B to compartment A, with like trailer sway, skidding or jack-knifing arresting effect.

As many changes could be made in the above described constructions, and many apparently widely different embodiments of this invention could be made without departing from the scope thereof, as defined by the following claims, it is intended that all matter contained in the above description or shown in the accompanying drawings shall be interpreted as illustrative and not in a limiting sense.

I claim—

1. In coupler mechanism for the purposes described, a tractor carried fifth-wheel means incapable of rotative movement in horizontal plane, a king-pin releasably interengageable with said fifth-wheel means in non-rotative relation thereto, a trailer carried liquid charged chambered body arranged in non-rotative relation to the trailer, said chambered body having bearings to rotatably support said king-pin, and a valved check-plate within said chambered body, said check-plate being fixedly related to said king-pin.

2. In coupler mechanism for the purposes described, fifth-wheel means, a king-pin adapted to be coupled with said fifth-wheel means, a liquid charged chambered body rotatably related to said king-pin, a valved check-plate within said chambered body, said check-plate being fixedly related to said king-pin, and means to hold said king-pin against rotation relative to said fifth-wheel means when coupled therewith.

3. Coupler mechanism for the purposes described, comprising interengageable tractor-truck carried fifth-wheel means and trailer carried king-pin means, said latter means including a rotatively related liquid charged chambered body and a king-pin, said king-pin having a check-plate means dividing the interior of said chambered body into compartments, said check-plate means having valve port means to provide communication between said compartments, and normally open valve means cooperative with said valve port means, said valve means being adapted to close under excess liquid pressure developed in either compartment by sudden relative rotary movement of said chambered body and king-pin check-plate.

4. Coupler mechanism for the purposes described, comprising a tractor-truck carried fifth-wheel means, a trailer carried king-pin means, said latter means including a rotatively related liquid charged chambered body and a king-pin, said king-pin having a check plate means dividing the interior of said chambered body into compartments, said check-plate means having valve port means to provide normal communication between said compartments, normally open valve means cooperative with said valve port means, said valve means being adapted to close under excess liquid pressure developed in either compartment by sudden relative rotary movement of said chambered body and king-pin check-plate, said king-pin having a portion exteriorly projecting from said chambered body, said fifth-wheel means having means to receive and engage said projecting portion of said king-pin, and means to hold said king-pin against rotation relative to said fifth-wheel means when engaged therewith.

5. In mechanism for releasably coupling tractor and trailer vehicles, a fifth-wheel means mounted on one of said vehicles so as to be incapable of rotative movement in horizontal plane, a king-pin rotatably mounted on the other of said vehicles and adapted to be coupled to said fifth-wheel means in stationary relation thereto, and liquid charged check means chamber carried by said last named vehicle including liquid compression means connected with and actuated by the rotatable movements of said king-pin relative to said last named vehicle and the liquid charged check means chamber carried thereby.

GEORGE PALMER HUMPHREY.